United States Patent [19]

Amato

[11] Patent Number: 5,546,970
[45] Date of Patent: Aug. 20, 1996

[54] ANIMAL UMBRELLA

[76] Inventor: Michael Amato, 2270 W. 1st St., Brooklyn, N.Y. 11223

[21] Appl. No.: 570,594

[22] Filed: Dec. 11, 1995

[51] Int. Cl.⁶ .............................. A01K 1/06; A45B 11/02
[52] U.S. Cl. .................. 135/16; 135/90; 135/96; 135/98; 119/858
[58] Field of Search ........................ 135/16, 90, 96, 135/98, 905; 54/80.1, 79.1; 119/850, 858

[56] References Cited

U.S. PATENT DOCUMENTS

| | | | |
|---|---|---|---|
| 1,460,821 | 7/1923 | Morris | 135/16 |
| 1,704,407 | 3/1929 | Rice | 135/98 X |
| 2,223,253 | 11/1940 | Hamilton | 135/98 X |
| 2,434,526 | 1/1948 | Thornton | 135/98 X |
| 3,554,203 | 1/1971 | Hall, Sr. | 135/16 |
| 3,999,521 | 12/1976 | Puiello | 119/858 X |
| 5,184,762 | 2/1993 | Nevitt | 119/858 X |
| 5,199,383 | 4/1993 | Lagana | 119/858 |
| 5,353,977 | 10/1994 | Schiro, Jr. et al. | 135/16 X |

FOREIGN PATENT DOCUMENTS

| | | | |
|---|---|---|---|
| 364384 | 8/1906 | France | 54/80.1 |
| 165631 | 11/1905 | Germany | 54/80.1 |

*Primary Examiner*—Wynn E. Wood
*Attorney, Agent, or Firm*—Richard L. Miller, P.E.

[57] ABSTRACT

An animal umbrella that is adaptable to a conventional animal harness and collar. The animal umbrella includes a saddle, saddle attaching apparatus, a vertical shank, vertical shank attaching apparatus, and a rigid canopy. The saddle is detachably mounted to the conventional animal harness and is pivotally mounted to the conventional animal collar. The saddle has a lower surface. The saddle attaching apparatus detachably mounts the saddle to the conventional animal harness. The vertical shank has a proximal end with a cross section and a distal end with a cross section. The vertical shank is detachably mounted to the saddle at the proximal end of the vertical shank. The vertical shank attaching apparatus detachably mounts the vertical shank to the saddle. And, the rigid canopy is detachably mounted to the distal end of the vertical shank.

18 Claims, 1 Drawing Sheet

U.S. Patent     Aug. 20, 1996     5,546,970
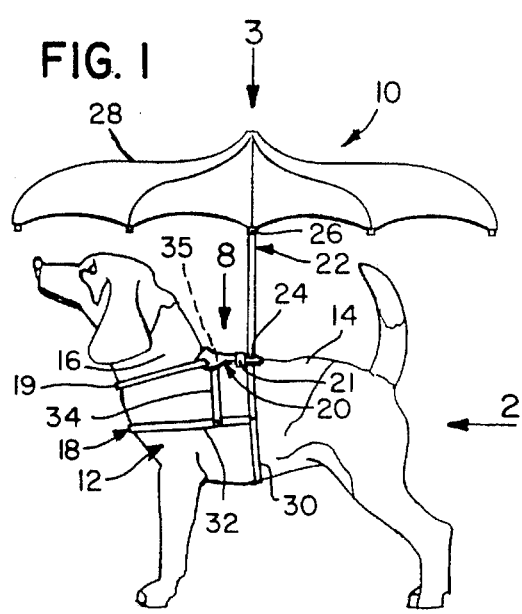
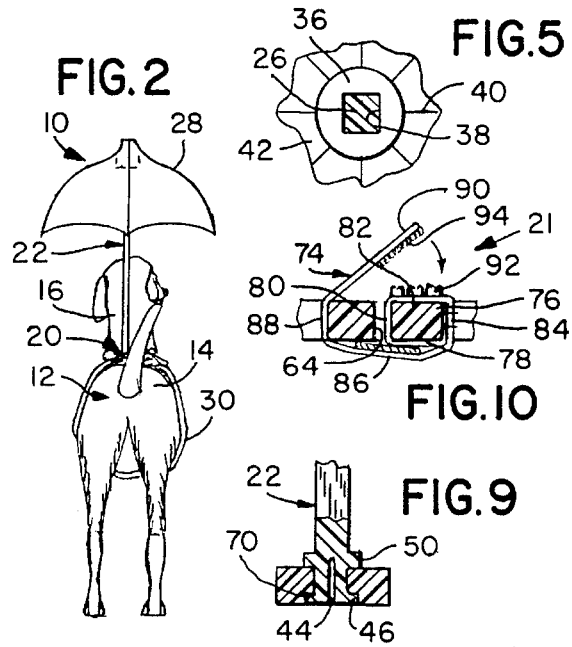
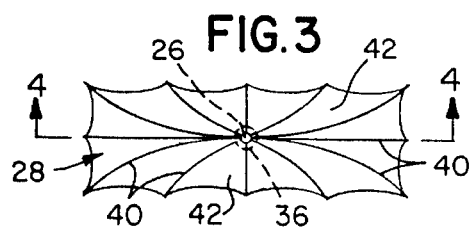
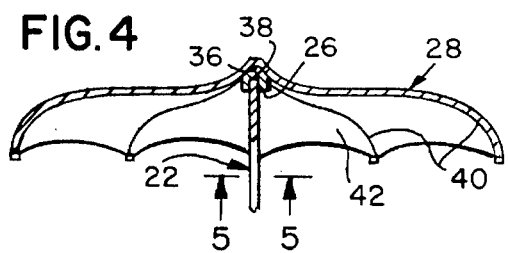
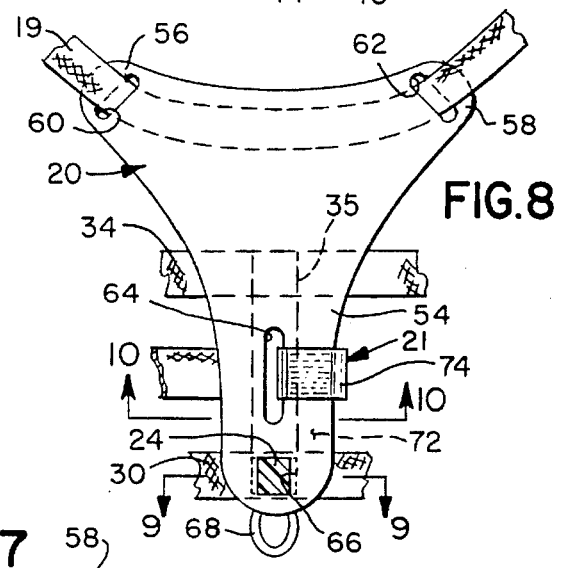
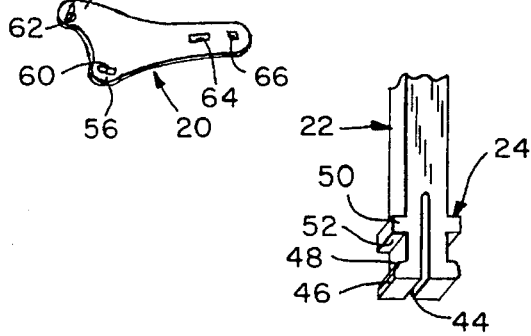
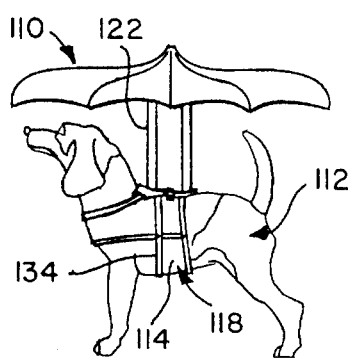

ANIMAL UMBRELLA

BACKGROUND OF THE INVENTION

The present invention relates to an animal umbrella. More particularly, the present invention relates to an animal umbrella that is adaptable to a conventional animal harness and collar and includes a saddle removably mounted to the conventional animal harness and pivotally mounted to the conventional animal collar, a vertical shaft detachably mounted to the saddle, and a canopy detachably mounted to the vertical shaft.

Animals as well as humans require protection from the rain when they are being walked. It is not a simple task to have the walker hold an umbrella both over himself and the animal he is walking.

Numerous innovations for umbrella devices have been provided in the prior art that will be described. However, even though these innovations may be suitable for the specific individual purposes to which they address, they differ from the present invention in that they do not teach an animal umbrella that is adaptable to a conventional animal harness and collar and includes a saddle removably mounted to the conventional animal harness and pivotally mounted to the conventional animal collar, a vertical shaft detachably mounted to the saddle, and a canopy detachably mounted to the vertical shaft.

FOR EXAMPLE, U.S. Pat No. D.324,117 to Antoine teaches an ornamental design for a dog umbrella that includes a curtain draping downwardly from the umbrella portion.

ANOTHER EXAMPLE, U.S. Pat No. D.324,943 to Wu teaches an ornamental design for an animal umbrella that is in the form of a cap with pointed ears extending outwardly therefrom.

STILL ANOTHER EXAMPLE, U.S. Pat No. D.325,296 to Wu teaches an ornamental design for an animal umbrella that is in the form of a cap with circular ears extending outwardly therefrom.

FINALLY, YET ANOTHER EXAMPLE, U.S. Pat No. 4,537,339 to Pearson teaches a mount removably pivotally mounted to a user's body that includes a planar support having upper and lower pockets thereon to receive the handle of the umbrella. Straps are provided to secure the umbrella handle to the planar support.

It is apparent that numerous innovations for umbrella devices have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide an animal umbrella that avoids the disadvantages of the prior art.

ANOTHER OBJECT of the present invention is to provide an animal umbrella that is simple and inexpensive to manufacture.

STILL ANOTHER OBJECT of the present invention is to provide an animal umbrella that is simple to use.

YET ANOTHER OBJECT of the present invention is to provide a animal umbrella that provides a shelter from rain sun and other elements for animals.

STILL YET ANOTHER OBJECT of the present invention is to provide an animal umbrella that is self-supporting.

YET STILL ANOTHER OBJECT of the present invention is to provide an animal umbrella that easily attaches to and detaches from a conventional animal harness and collar.

BRIEFLY STATED, STILL YET ANOTHER OBJECT of the present invention is to provide an animal umbrella that includes a saddle, saddle attaching apparatus, a vertical shank, vertical attaching apparatus, and a rigid canopy.

YET STILL ANOTHER OBJECT of the present invention is to provide an animal umbrella wherein the saddle is detachably mounted to the conventional animal harness and is pivotally mounted to the conventional animal collar.

STILL YET ANOTHER OBJECT of the present invention is to provide an animal umbrella wherein the saddle has a lower surface.

YET STILL ANOTHER OBJECT of the present invention is to provide an animal umbrella wherein the saddle attaching apparatus detachably mounts the saddle to the conventional animal harness.

STILL YET ANOTHER OBJECT of the present invention is to provide an animal umbrella wherein the vertical shank has a proximal end with a cross section and a distal end with a cross section.

YET STILL ANOTHER OBJECT of the present invention is to provide an animal umbrella wherein the vertical shank is detachably mounted to the saddle at the proximal end of the vertical shank.

STILL YET ANOTHER OBJECT of the present invention is to provide an animal umbrella wherein the vertical shank attaching apparatus detachably mounts the vertical shank to the saddle.

YET STILL ANOTHER OBJECT of the present invention is to provide an animal umbrella wherein the rigid canopy is detachably mounted to the distal end of the vertical shank.

STILL YET ANOTHER OBJECT of the present invention is to provide an animal umbrella wherein the rigid canopy is nonfoldable and is one piece molded plastic in a substantially elongated rectangular shape.

YET STILL ANOTHER OBJECT of the present invention is to provide an animal umbrella wherein the rigid canopy includes a center cap with an aperture.

STILL YET ANOTHER OBJECT of the present invention is to provide an animal umbrella wherein the distal end of the vertical shank is detachably mounted in the aperture of the center cap of the rigid canopy.

YET STILL ANOTHER OBJECT of the present invention is to provide an animal umbrella wherein the aperture of the center cap of the rigid canopy has a cross section that is substantially equal to the cross section of the distal end of the vertical shank.

STILL YET ANOTHER OBJECT of the present invention is to provide an animal umbrella wherein the cross section of the aperture of the center cap of the rigid canopy and the cross section of the distal end of the vertical shank are square.

YET STILL ANOTHER OBJECT of the present invention is to provide an animal umbrella wherein the rigid canopy further includes a plurality of ribs that extend radially outwardly and downwardly from the center cap of the rigid canopy, and a plurality of webs that extend outwardly from the center cap of the rigid canopy and connect each of the plurality of ribs of the rigid canopy to each other.

STILL YET ANOTHER OBJECT of the present invention is to provide an animal umbrella wherein the vertical shank is selected from the group consisting of plastic and wood.

YET STILL ANOTHER OBJECT of the present invention is to provide an animal umbrella wherein the vertical shaft has a diameter of ⅜ inch and a length in a range of 12 to 14 inches.

STILL YET ANOTHER OBJECT of the present invention is to provide an animal umbrella wherein the proximal end of the vertical shank has a longitudinally disposed slot that passes through opposite sides thereof.

YET STILL ANOTHER OBJECT of the present invention is to provide an animal umbrella wherein the proximal end of the vertical shank further has a pair of lower tabs that are disposed on opposing sides that are opposite the opposing sides through which the longitudinally disposed slot of the proximal end of the vertical shank passes.

STILL YET ANOTHER OBJECT of the present invention is to provide an animal umbrella wherein each of the pair of lower tabs of the proximal end of the vertical shank has a convex upper edge.

YET STILL ANOTHER OBJECT of the present invention is to provide an animal umbrella wherein the proximal end of the vertical shank further has a pair of upper tabs that are disposed on the opposing sides of the proximal end of the vertical shank on which the pair of lower tabs of the proximal end of the vertical shank are disposed.

STILL YET ANOTHER OBJECT of the present invention is to provide an animal umbrella wherein each of the pair of upper tabs of the proximal end of the vertical shank are displaced a distance upward from a respective one of the pair of lower tabs of the proximal end of the vertical shank and together with the respective one of the pair of lower tabs of the proximal end of the vertical shank define a recess therebetween.

YET STILL ANOTHER OBJECT of the present invention is to provide an animal umbrella wherein the saddle is a substantially Y-shaped member that has a body portion, an upper left branch portion that extends upwardly and outwardly from the body portion of the saddle, and an upper right branch portion that extends upwardly and outwardly from the body portion of the saddle and away from the upper left branch portion of the saddle.

STILL YET ANOTHER OBJECT of the present invention is to provide an animal umbrella wherein the upper left branch portion of the saddle has an outboard slotted aperture, the upper right branch portion of the saddle has an outboard slotted aperture, and the body portion of the saddle has an inboard slotted aperture and an outboard aperture.

YET STILL ANOTHER OBJECT of the present invention is to provide an animal umbrella wherein the outboard aperture of the body portion of the saddle has a cross section substantially equal to the cross section of the proximal end of the vertical shank.

STILL YET ANOTHER OBJECT of the present invention is to provide an animal umbrella wherein the cross section of the outboard aperture of the body portion of the saddle and the cross section of the proximal end of the vertical shank are square.

YET STILL ANOTHER OBJECT of the present invention is to provide an animal umbrella wherein the outboard lower aperture of the lower surface of the saddle detachably receives the pair of lower tabs of the proximal end of the vertical shank.

STILL YET ANOTHER OBJECT of the present invention is to provide an animal umbrella wherein the saddle attaching apparatus includes an attaching strap.

YET STILL ANOTHER OBJECT of the present invention is to provide an animal umbrella wherein the attaching strap of the saddle attaching apparatus includes a fixed end portion that is secured at a side of the body portion of the saddle, a short lower portion that extends from the fixed end of the attaching strap and passes under the body portion of the saddle, a short inner portion that extends from the short lower portion of the saddle attaching strap upwardly through the inboard slotted aperture of the body portion of the saddle, a short upper portion that extends from the short inner portion of the saddle attaching strap over the body portion of the saddle, a short outer portion that extends from the short upper portion of the saddle attaching strap downwardly over the fixed end of the saddle attaching strap and is secured thereto, a long lower portion that extends from the short outer portion of the saddle attaching strap and passes over the short lower portion of the saddle attaching strap, a short opposite outer portion that extends from the long lower portion of the saddle attaching strap upwardly along an opposite side of the body portion of the saddle, a free end portion that YET STILL ANOTHER OBJECT of the present invention is to provide an animal umbrella wherein the conventional animal collar passes freely through both the outboard slotted aperture of the upper left branch portion of the saddle and the outboard slotted aperture of the upper right branch portion of the saddle and allows the saddle to pivot relative thereto.

STILL YET ANOTHER OBJECT of the present invention is to provide an animal umbrella wherein the short vertical strap of the conventional animal harness passes freely under the inboard slotted aperture of the body portion of the saddle.

YET STILL ANOTHER OBJECT of the present invention is to provide an animal umbrella wherein the long vertical strap of the conventional animal harness passes freely under the outboard aperture of the body portion of the saddle.

STILL YET ANOTHER OBJECT of the present invention is to provide an animal umbrella wherein the upper horizontal strap of the conventional animal harness extends freely under the inboard slotted aperture of the body portion of the saddle.

YET STILL ANOTHER OBJECT of the present invention is to provide an animal umbrella wherein the lower surface of the saddle has an outboard lower aperture.

STILL YET ANOTHER OBJECT of the present invention is to provide an animal umbrella wherein the outboard lower aperture of the lower surface of the saddle is wider than, and concentrically disposed with, the outboard aperture of the body portion of the saddle. extends from the short opposite outer portion of the saddle attaching strap over the short upper portion of the saddle attaching strap, a portion of hook and loop fasteners is disposed at the short upper portion of the saddle attaching strap, and a mating portion of the hook and loop fasteners is disposed at the free end portion of the saddle attaching strap.

STILL YET ANOTHER OBJECT of the present invention is to provide an animal umbrella that further includes another vertical shank.

FINALLY, YET STILL ANOTHER OBJECT of the present invention is to provide a method of utilizing an animal umbrella that includes the steps of putting on a conventional animal harness around the body of the animal, putting on a conventional animal collar which has been threaded through a saddle of the animal umbrella around the neck of the animal, pivoting downwardly the saddle onto the conventional animal harness with a long lower portion of a saddle attaching strap of the animal umbrella passing under an upper horizontal strap of the harness, pulling tightly a free end portion of the saddle attaching strap, affixing a portion of hook and loop fasteners of the animal umbrella to a mating portion of the hook and loop fasteners securing the saddle in place on the harness, placing a distal end of a vertical shank of the animal umbrella into an aperture of a center cap of a rigid canopy of the animal umbrella, placing a proximal end of the vertical shank into an aperture of a body portion of the saddle, and compressing a longitudinally disposed slot of the proximal end of the vertical shank until a pair of lower tabs of the proximal end of the vertical shank expand into an outboard lower aperture of a lower surface of a saddle body portion of the saddle and a pair of upper tabs of the proximal end of the vertical shank rest on an upper surface of the saddle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic side elevational view of a first embodiment of the present invention installed on an animal;

FIG. 2 is a diagrammatic rear elevational view taken in the direction of arrow 2 in FIG. 1;

FIG. 3 is a diagrammatic top plan view taken in the direction of arrow 3 in FIG. 1;

FIG. 4 is a cross sectional view taken on line 4—4 in FIG. 3;

FIG. 5 is an enlarged partial section view, with parts broken away, on line 5—5 in FIG. 4;

FIG. 6 is an enlarged diagrammatic perspective view of the vertical post, with parts broken away;

FIG. 7 is a diagrammatic perspective view of the saddle component of the present invention;

FIG 8 is an enlarged plan view of the saddle component of the present invention taken in the direction of arrow 8 in FIG. 1, with parts broken away;

FIG. 9 is cross sectional view taken on line 9—9 in FIG. 8;

FIG. 10 is a cross sectional view, with parts broken away, taken on line 10—10 in FIG. 8; and FIG. 11 is a diagrammatic side elevational view of a second embodiment of the present invention installed on the animal.

LIST OF REFERENCE NUMERALS UTILIZED IN THE DRAWING

Preferred Embodiment

| | |
|---|---|
| 10 | animal umbrella of the present invention |
| 12 | animal |
| 14 | animal body |
| 16 | animal neck |
| 18 | conventional animal harness |
| 19 | conventional animal collar |
| 20 | saddle |
| 21 | saddle attaching apparatus |
| 22 | vertical shank |
| 24 | vertical shank proximal end |
| 26 | vertical shank distal end |
| 28 | rigid canopy |
| 30 | harness long vertical strap |
| 32 | harness lower horizontal strap |
| 34 | harness short vertical strap |
| 35 | harness upper horizontal strap |
| 36 | rigid canopy center cap |
| 38 | rigid canopy center cap aperture |
| 40 | plurality of rigid canopy ribs |
| 42 | plurality rigid canopy webs |
| 44 | longitudinally disposed vertical shank proximal end slot |
| 46 | pair of vertical shank proximal end lower tabs |
| 48 | vertical shank proximal end lower tab convex upper edge |
| 50 | pair of vertical shank proximal end upper tabs |
| 52 | vertical shank proximal end tab recess |
| 54 | saddle body portion |
| 56 | saddle upper left branch portion |
| 58 | saddle upper right branch portion |
| 60 | saddle upper left branch portion outboard slotted aperture |
| 62 | saddle upper right branch portion outboard slotted aperture |
| 64 | saddle body portion inboard slotted aperture |
| 66 | saddle body portion outboard aperture |
| 68 | leash ring |
| 70 | saddle body portion outboard lower aperture |
| 72 | saddle body portion lower surface |
| 74 | saddle attaching strap |
| 76 | saddle attaching strap fixed end portion |
| 78 | saddle attaching strap short lower portion |
| 80 | saddle attaching strap short inner portion |
| 82 | saddle attaching strap short upper portion |
| 84 | saddle attaching strap short outer portion |
| 86 | saddle attaching strap long lower portion |
| 88 | saddle attaching strap short opposite outer portion |
| 90 | saddle attaching strap free end portion |
| 92 | portion of hook and loop fasteners |
| 94 | mating portion of the hook and loop fasteners |

Alternate Embodiment

| | |
|---|---|
| 110 | animal umbrella of the present invention |
| 112 | animal |
| 114 | animal body |
| 118 | conventional animal harness |
| 122 | second vertical shank |
| 134 | second long vertical strap |

DETAILED DESCRIPTION OF THE PREFERRED EMBODIMENT

Referring now to the figures in which like numerals indicate like parts, and particularly to FIGS. 1 and 2, the animal umbrella of the present invention is shown generally at 10 installed on an animal 12 that has an animal body 14 and an animal neck 16.

The overall configuration of the animal umbrella 10 can best be seen in FIGS. 1 and 2, and as such, will be discussed with reference thereto.

The animal umbrella 10 is adaptable to a conventional animal harness 18 that is installable on the animal body 14 of the animal 12 and is also adaptable to a conventional animal collar 19 that is installable around the animal neck 16 of the animal 12.

The animal umbrella 10 includes a saddle 20 detachably mounted to the conventional animal harness 18 by saddle attaching apparatus 21 and pivotally mounted to the conventional animal collar 19, a vertical shank 22 having a vertical shank proximal end 24 and a vertical shank distal end 26 that is detachably mounted to the saddle 20 at the vertical shank proximal end 24 of the vertical shank 22, and a rigid canopy 28 that is detachably mounted to the vertical shank distal end 26 of the vertical shank 22.

The configuration of the conventional animal harness 18 can best be seen in FIGS. 1 and 2, and as such, will be discussed with reference thereto.

The conventional animal harness 18 includes a harness long vertical strap 30 encircling the animal body 14 of the animal 12, a harness lower horizontal strap 32 extending forward of the harness long vertical strap 30 of the harness 18 and around the front of the animal body 14 of the animal 12, a harness short vertical strap 34 extending upwardly from the harness lower horizontal strap 32 of the harness 18 and around the top of the animal body 14 of the animal 12, and a harness upper horizontal strap 35 extending between the harness long vertical strap 30 of the harness 18 and the harness short vertical strap 34 of the harness 18.

The configuration of the rigid canopy 28 can best be seen in FIGS. 3–5, and as such will be discussed with reference thereto.

The rigid canopy 28 is non-foldable and is one piece and molded from plastic in a substantially elongated rectangular shape.

The rigid canopy 28 includes a rigid canopy center cap 36 with a rigid canopy center cap aperture 38 into which the vertical shank distal end 26 of the vertical shank 22 is detachably mounted. The rigid canopy center cap aperture 38 of the rigid canopy center cap 36 of the rigid canopy 28 can be substantially square-shaped, but is not limited to that.

Extending radially outwardly and downwardly from the rigid canopy center cap 36 of the rigid canopy 28 are a plurality of rigid canopy ribs 40.

A plurality rigid canopy webs 42 extend outwardly from the rigid canopy center cap 36 of the rigid canopy 28 and connect each of the plurality of rigid canopy ribs 40 of the rigid canopy 28 to each other.

The configuration of the vertical shank 22 can best be seen in FIG. 6, and as such, will be discussed with reference thereto.

For purposes of illustration, the vertical shank 22 has a substantially square-shaped cross section, but is not limited to that. The cross section of the vertical shank distal end 26 of the vertical shank 22, however, must match the cross section of the rigid canopy center cap aperture 38 of the rigid canopy center cap 36 of the rigid canopy 28.

The vertical shank 22 may be plastic or wood with a typical diameter of ⅜ inch and a length in the range of 12 to 14 inches, but is not limited to that.

The vertical shank proximal end 24 of the vertical shank 22 has a longitudinally disposed vertical shank proximal end slot 44 passing through opposite sides thereof.

Each of a pair of vertical shank proximal end lower tabs 46 of the vertical shank proximal end 24 of the vertical shank 22 extends outwardly from opposing sides of the vertical shank proximal end 24 of the vertical shank 22 that are opposite the opposing sides through which the longitudinally disposed vertical shank proximal end slot 44 of the vertical shank proximal end 24 of the vertical shank 22 passes.

Each of the pair of vertical shank proximal end lower tabs 46 of the vertical shank proximal end 24 of the vertical shank 22 has a vertical shank proximal end lower tab convex upper edge 48.

Each of a pair of vertical shank proximal end upper tabs 50 of the vertical shank proximal end 24 of the vertical shank 22 extends outwardly from the sides of the vertical shank proximal end 24 of the vertical shank 22 on which the pair of vertical shank proximal end lower tabs 46 of the vertical shank proximal end 24 of the vertical shank 22 are disposed.

Each of the pair of vertical shank proximal end upper tabs 50 of the vertical shank proximal end 24 of the vertical shank 22 are displaced a distance upward from a respective one of the pair of vertical shank proximal end lower tabs 46 of the vertical shank proximal end 24 of the vertical shank 22 and together with the respective one of the pair of vertical shank proximal end lower tabs 46 of the vertical shank proximal end 24 of the vertical shank 22 define a vertical shank proximal end tab recess 52 therebetween.

The configuration of the saddle 20 and its detachable arrangement with the vertical shank proximal end 24 of the vertical shank 22 can best be seen in FIGS. 7–9, and as such, will be discussed with reference thereto.

The saddle 20 is a substantially Y-shaped member having a saddle body portion 54, a saddle upper left branch portion 56 extending upwardly and outwardly from the saddle body portion 54 of the saddle 20, and a saddle upper right branch portion 58 extending upwardly and outwardly from the saddle body portion 54 of the saddle 20 and away from the saddle upper left branch portion 56 of the saddle 20.

The saddle upper left branch portion 56 of the saddle 20 has a saddle upper left branch portion outboard slotted aperture 60.

The saddle upper right branch portion 58 of the saddle 20 has a saddle upper right branch portion outboard slotted aperture 62.

The saddle body portion 54 of the saddle 20 has a saddle body portion inboard slotted aperture 64 and a saddle body portion outboard aperture 66.

For purposes of illustration, the saddle body portion outboard aperture 66 of the saddle body portion 54 of the saddle 20 has a substantially square-shaped cross section, but is not limited to that. The cross section of the saddle body portion outboard aperture 66 of the saddle body portion 54 of the saddle 20, however, must match the cross section of the vertical shank proximal end 24 of the vertical shank 22.

A leash ring 68 is pivotally mounted to the conventional animal harness 18 and is used to receive a standard leash (not shown).

As shown in FIG. 8, the conventional animal collar 19 passes freely through both the saddle upper left branch portion outboard slotted aperture 60 of the saddle upper left branch portion 56 of the saddle 20 and the saddle upper right branch portion outboard slotted aperture 62 of the saddle upper right branch portion 58 of the saddle 20, and as such, allows the saddle 20 to pivot therefrom.

The harness short vertical strap 34 of the conventional animal harness 18 passes freely under the saddle body portion 54 of the saddle 20 inboard of the saddle body portion inboard slotted aperture 64 of the saddle body portion 54 of the saddle 20.

The harness long vertical strap 30 of the conventional animal harness 18 passes freely under the saddle body portion outboard aperture 66 of the saddle body portion 54 of the saddle 20, so that the pressure exerted by the weight of the combination of the vertical shank 22 and the rigid canopy 28 is dissipated therealong.

The harness upper horizontal strap 35 of the conventional animal harness 18 extends under, and in alignment with, the saddle body portion inboard slotted aperture 64 of the saddle body portion 54 of the saddle 20.

As shown in FIG. 9, a saddle body portion outboard lower aperture 70 of the saddle body portion 54 of the saddle 20 is disposed on a saddle body portion lower surface 72. The saddle body portion outboard lower aperture 70 of the saddle body portion lower surface 72 of the saddle body portion 54 of the saddle 20 is wider than, and concentrically disposed with, the saddle body portion outboard aperture 66 of the saddle body portion 54 of the saddle 20.

The saddle body portion outboard lower aperture 70 of the saddle body portion lower surface 72 of the saddle body portion 54 of the saddle 20 detachably receives the pair of vertical shank proximal end lower tabs 46 of the vertical shank proximal end 24 of the vertical shank 22.

The configuration of the saddle attaching apparatus 21 can best be seen in FIGS. 8 and 10, and as such, will be discussed with reference thereto.

The saddle attaching apparatus 21 includes a saddle attaching strap 74. A saddle attaching strap fixed end portion 76 of the saddle attaching strap 74 is secured at a side of the saddle body portion 54 of the saddle 20. A saddle attaching strap short lower portion 78 extends from the saddle attaching strap fixed end 76 of the saddle attaching strap 74 and passes under the saddle body portion 54 of the saddle 20. A saddle attaching strap short inner portion 80 extends from the saddle attaching strap short lower portion 78 of the saddle attaching strap 74 upwardly through the saddle body portion inboard slotted aperture 64 of the saddle body portion 54 of the saddle 20. A saddle attaching strap short upper portion 82 extends from the saddle attaching strap short inner portion 80 of the saddle attaching strap 74 over the top of the saddle body portion 54 of the saddle 20. A saddle attaching strap short outer portion 84 extends from the saddle attaching strap short upper portion 82 of the saddle attaching strap 74 downwardly over the saddle attaching strap fixed end 76 of the saddle attaching strap 74 and is secured thereto. A saddle attaching strap long lower portion 86 extends from the saddle attaching strap short outer portion 84 of the saddle attaching strap 74 and passes the saddle attaching strap short lower portion 78 of the saddle attaching strap 76 until the opposite side of the saddle body portion 54 of the saddle 20. A saddle attaching strap short opposite outer portion 88 extends from the saddle attaching strap long lower portion 86 of the saddle attaching strap 74 upwardly along the opposite side of the saddle body portion 54 of the saddle 20. A saddle attaching strap free end portion 90 extends from the saddle attaching strap short opposite outer portion 88 of the saddle attaching strap 74 over the saddle attaching strap short upper portion 82 of the saddle attaching strap 74. A portion 92 of hook and loop fasteners is disposed at the saddle attaching strap short upper portion 82 of the saddle attaching strap 74 and a mating portion 94 of the hook and loop fasteners is disposed at the saddle attaching strap free end portion 90 of the saddle attaching strap 74.

In operation, the conventional animal harness 18 is put on the animal body 14 of the animal 12. The conventional animal collar 19, which has been threaded through the saddle 20, is put on the animal neck 16 of the animal 12.

The saddle 20 is pivoted downwardly and placed on the conventional animal harness 18 with the saddle attaching strap long lower portion 86 of the saddle attaching strap 74 passing under the harness upper horizontal strap 35 of the conventional animal harness 18. The saddle attaching strap free end portion 90 of the saddle attaching strap 74 is pulled tight and the loop portion 94 of hook and loop fasteners is affixed to the hook portion 92 of the hook and loop fasteners securing the saddle 20 in place on the conventional animal harness 18.

The vertical shank distal end 26 of the vertical shank 22 is placed into the rigid canopy center cap aperture 38 of the rigid canopy center cap 36 of the rigid canopy 28.

The vertical shank proximal end 24 of the vertical shank 22 is placed into the saddle body portion outboard aperture 66 of the saddle body portion 54 of the saddle 20 and the longitudinally disposed vertical shank proximal end slot 44 of the vertical shank proximal end 24 of the vertical shank 22 compresses until the pair of vertical shank proximal end lower tabs 46 of the vertical shank proximal end 24 of the vertical shank 22 expand into the saddle body portion outboard lower aperture 70 of the saddle body portion lower surface 72 of the saddle body portion 54 of the saddle 20 and the pair of vertical shank proximal end upper tabs 50 of the vertical shank proximal end 24 of the vertical shank 22 rest on the upper surface of the saddle 20.

Due to the curvature of the vertical shank proximal end lower tab convex upper edge 48 of the pair of vertical shank proximal end lower tabs 46 of the vertical shank proximal end 24 of the vertical shank 22, the vertical shaft 22 can be readily removed from the saddle 20 when required.

An alternate embodiment of the animal umbrella 110 can best be seen in FIG. 11, and as such, will be discussed with reference thereto.

The animal umbrella 110 is identical to the animal umbrella 10 except that the harness short vertical strap 34 of the conventional animal harness 118 is replaced with a second long vertical strap 134 which passes completely around the animal body 114 of the animal 112, and a second vertical shank 122 is used.

It will be understood that each of the elements described above, or two or more together, may also find a useful application in other types of constructions differing from the types described above.

While the invention has been illustrated and described as embodied in an animal umbrella, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An animal umbrella adaptable to a conventional animal harness and collar, comprising:

a) a saddle detachably mountable to the conventional animal harness and pivotally mountable to the conventional animal collar, said saddle having a lower surface;

b) saddle attaching means for detachably mounting said saddle to the conventional animal harness;

c) a vertical shank having a proximal end with a cross section and a distal end with a cross section, said vertical shank being detachably mounted to said saddle at said proximal end of said vertical shank;

d) vertical shank attaching means for detachably mounting said vertical shank to said saddle; and e) a rigid canopy detachably mounted to said distal end of said vertical shank.

2. The umbrella as defined in claim 1, wherein said rigid canopy is non-foldable and is one piece and is molded from plastic in a substantially elongated rectangular shape.

3. The umbrella as defined in claim 1, wherein said rigid canopy includes a center cap with an aperture, said distal end of said vertical shank is detachably mounted in said aperture of said center cap of said rigid canopy, said aperture of said center cap of said rigid canopy has a cross section that is substantially equal to said cross section of said distal end of said vertical shank.

4. The umbrella as defined in claim 3, wherein said cross section of said aperture of said center cap of said rigid canopy and said cross section of said distal end of said vertical shank are square.

5. The umbrella as defined in claim 3, wherein said rigid canopy further includes a plurality of ribs that extend radially outwardly and downwardly from said center cap of said rigid canopy, and a plurality of webs that extend outwardly from said center cap of said rigid canopy and connect each of said plurality of ribs of said rigid canopy to each other.

6. The umbrella as defined in claim 1, wherein said vertical shank is selected from the group consisting of plastic and wood, said vertical shank has a diameter of ⅜ inch and a length in a range of 12 to 14 inches.

7. The umbrella as defined in claim 1, wherein said proximal end of said vertical shank has a longitudinally disposed slot that passes through opposite sides thereof.

8. The umbrella as defined in claim 7, wherein said proximal end of said vertical shank further has a pair of lower tabs disposed on opposing sides that are opposite said opposing sides through which said longitudinally disposed slot of said proximal end of said vertical shank passes, each of said pair of lower tabs of said proximal end of said vertical shank has a convex upper edge.

9. The umbrella as defined in claim 8, wherein said proximal end of said vertical shank further has a pair of upper tabs disposed on said opposing sides of said proximal end of said vertical shank on which said pair of lower tabs of said proximal end of said vertical shank are disposed, each of said pair of upper tabs of said proximal end of said vertical shank is displaced a distance upward from a respective one of said pair of lower tabs of said proximal end of said vertical shank and together with said respective one of said pair of lower tabs of said proximal end of said vertical shank define a recess therebetween.

10. The umbrella as defined in claim 9, wherein said saddle is a substantially Y-shaped member that has a body portion, an upper left branch portion that extends upwardly and outwardly from said body portion of said saddle, and an upper right branch portion that extends upwardly and outwardly from said body portion of said saddle and away from said upper left branch portion of said saddle.

11. The umbrella as defined in claim 10, wherein said upper left branch portion of said saddle has an outboard slotted aperture, said upper right branch portion of said saddle has an outboard slotted aperture, and said body portion of said saddle has an inboard slotted aperture and an outboard aperture, said outboard aperture of said body portion of said saddle has a cross section substantially equal to said cross section of said proximal end of said vertical shank.

12. The umbrella as defined in claim 11, wherein said cross section of said outboard aperture of said body portion of said saddle and said cross section of said proximal end of said vertical shank are square.

13. The umbrella as defined in claim 11, wherein said outboard slotted aperture of said upper left branch portion of said saddle and said outboard slotted aperture of said upper right branch portion of said saddle are adapted to freely receive the conventional animal collar, so that said saddle pivots relative thereto, said body portion of said saddle is adapted to pass freely over a short vertical strap of the conventional animal harness, said outboard aperture of said body portion of said saddle is positionable over a long vertical strap of the conventional animal harness, and said inboard slotted aperture of said body portion of said saddle is positionable over an upper horizontal strap of the conventional animal harness.

14. The umbrella as defined in claim 13, wherein said lower surface of said saddle has an outboard lower aperture, said outboard lower aperture of said lower surface of said saddle is wider than, and concentrically disposed with, said outboard aperture of said body portion of said saddle.

15. The umbrella as defined in claim 14, wherein said outboard lower aperture of said lower surface of said saddle detachably receives said pair of lower tabs of said proximal end of said vertical shank.

16. The umbrella as defined in claim 15, wherein said saddle attaching means includes an attaching strap, said attaching strap includes a fixed end portion that is secured at a side of said body portion of said saddle, a short lower portion that extends from said fixed end of said attaching strap and passes under said body portion of said saddle, a short inner portion that extends from said short lower portion of said saddle attaching strap upwardly through said inboard slotted aperture of said body portion of said saddle, a short upper portion that extends from said short inner portion of said saddle attaching strap over said body portion of said saddle, a short outer portion that extends from said short upper portion of said saddle attaching strap downwardly over said fixed end of said saddle attaching strap, and is secured thereto, a long lower portion that extends from said short outer portion of said saddle attaching strap and passes over said short lower portion of said saddle attaching strap, a short opposite outer portion that extends from said long lower portion of said saddle attaching strap upwardly along an opposite side of said body portion of said saddle, a free end portion that extends from said shore opposite outer portion of said saddle attaching strap over said short upper portion of said saddle attaching strap, a portion of hook and loop fasteners is disposed at said short upper portion of said saddle attaching strap, and a mating portion of said hook and loop fasteners is disposed at said free end portion of said saddle attaching strap.

17. The umbrella as defined in claim 16; further comprising another vertical shank.

18. A method of utilizing an animal umbrella, comprising the steps of:

a) putting on a conventional animal harness around the body of an animal;

b) putting on a conventional animal collar, which has been threaded through a saddle of said animal umbrella, around the neck of the animal;

c) pivoting downwardly said saddle onto the conventional animal harness with a long lower portion of a saddle attaching strap of said animal umbrella passing under an upper horizontal strap of the conventional animal harness;

d) pulling tightly a free end portion of said saddle attaching strap;

e) affixing a portion of hook and loop fasteners of said animal umbrella to a mating portion of said hook and loop fasteners securing said saddle in place on the conventional animal harness;

f) placing a distal end of a vertical shank of said animal umbrella into an aperture of a center cap of a rigid canopy of said animal umbrella;

g) placing a proximal end of said vertical shank into an outboard aperture of a body portion of said saddle; and h) compressing a longitudinally disposed slot of said proximal end of said vertical shank until a pair of lower tabs of said proximal end of said vertical shank expand into an outboard lower aperture of a lower surface of a saddle body portion of said saddle and a pair of upper tabs of said proximal end of said vertical shank rest on an upper surface of said saddle.

* * * * *